United States Patent [19]

Koch

[11] Patent Number: 4,660,605

[45] Date of Patent: Apr. 28, 1987

[54] BELT WITH FLEXIBLE WEFT MATERIAL

[75] Inventor: Gerhard Koch, Ophain, Belgium

[73] Assignee: Ieperband N.V., Ieper, Belgium

[21] Appl. No.: 678,232

[22] Filed: Dec. 5, 1984

[30] Foreign Application Priority Data

Dec. 16, 1983 [DE] Fed. Rep. of Germany ....... 3345508

[51] Int. Cl.$^4$ ............................................ D03D 15/00
[52] U.S. Cl. ................................. 139/420 R; 139/117; 139/383 R; 139/387 R
[58] Field of Search ............... 139/117, 383 R, 383 A, 139/387 R, 420 R, 420 A, 426 R

[56] References Cited

U.S. PATENT DOCUMENTS

| 2,720,226 | 10/1955 | Helwith | 139/426 R |
| 2,903,021 | 9/1959 | Holden et al. | 139/383 A |
| 4,344,463 | 8/1982 | Muller et al. | 139/117 |

FOREIGN PATENT DOCUMENTS 686777  5/1964  Canada ............................ 139/420 R Primary Examiner—Henry S. Jaudon
Attorney, Agent, or Firm—Paul & Paul

[57] ABSTRACT

The invention relates to a woven belt, in particular for motor vehicle safety systems, which is found with a monofilament and a multifilament weft thread, both forming the central portion while only one forms the marginal portions.

11 Claims, 1 Drawing Figure

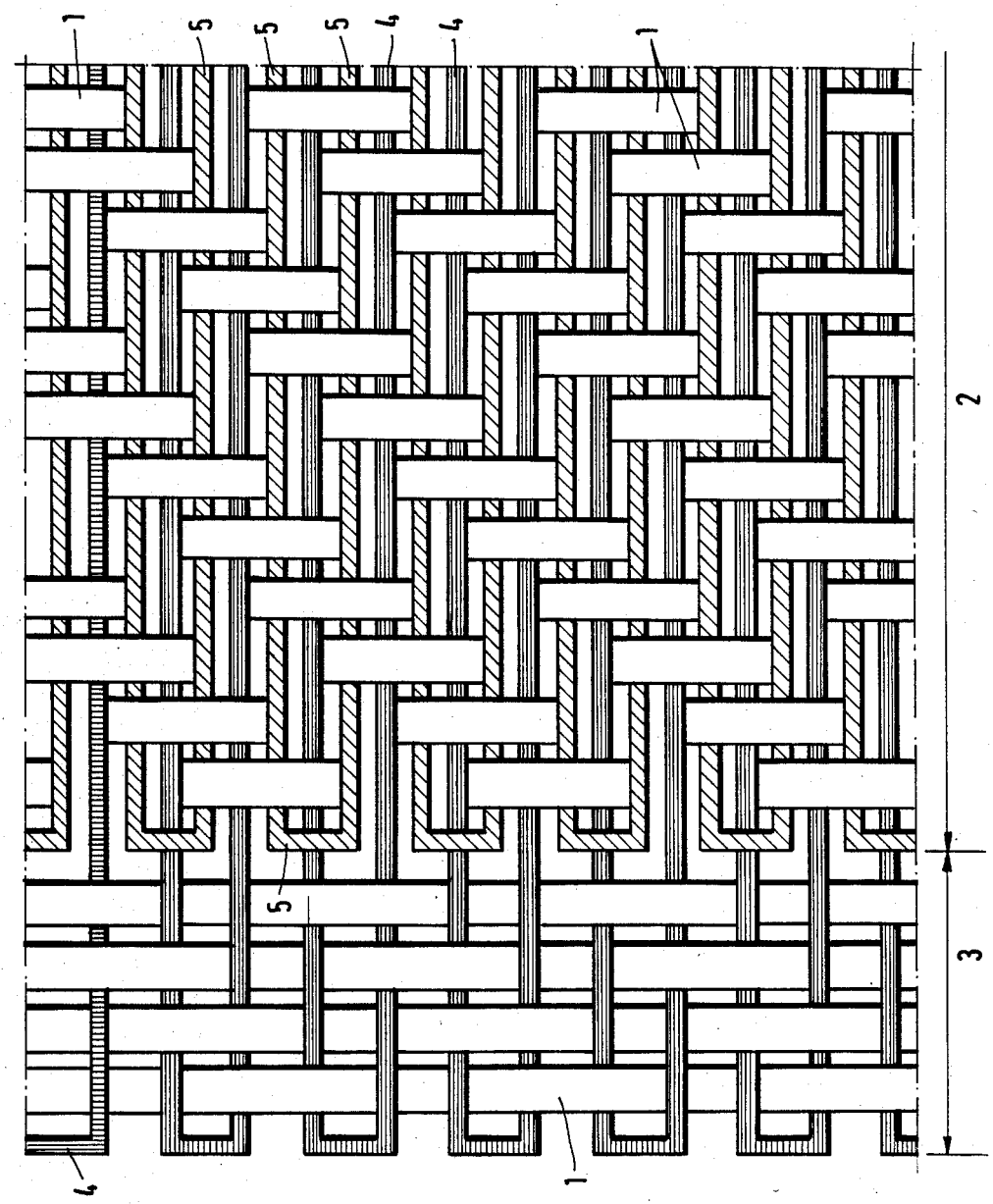

BELT WITH FLEXIBLE WEFT MATERIAL

This invention relates to a belt, in particular for motor vehicle safety systems, which is woven with a monofilament and a multifilament weft thread, a central portion and a marginal portion being formed.

A very wide range of different kinds of woven belts are known. Safety belts are used in aircraft and particularly widely in motor vehicles. Motor vehicles frequently have an automatic belt retractor unit which is disposed in the lower region on the door pillar and the belt is guided over the shoulder of the occupant of the vehicle, by way of a guide fitment which is fixed to the door pillar at the top, at the level of the shoulder or head of the occupant of the vehicle. The belt must be pulled through and changed in direction at the guide fitment, while in normal operation, in the course of time, a substantial length of safety belt is more or less quickly drawn through the guide fitment in one direction or the other. In that connection, the problem of twisting of the belt is known, which occurs particularly when the belt is of irregular and excessively low stiffness in the transverse direction. Also known is a further problem which involves a film spool effect, that is to say, the belt is wound on the belt roller or drum in an excessively loose condition so that at the moment of an accident, even when the belt roller or drum is locked, a certain length of belt can nonetheless be pulled out of the retractor unit. That causes the occupant of a vehicle to be thrown uncontrolledly forward, when an accident occurs.

To overcome those disadvantages, the attempt has already been made to weave in monofilament weft yarns in order to increase the stiffness of the belt in the transverse direction. However, those weft yarns are stiff and suffer from the disadvantage that, unless they are covered over at the edge of the belt, they produce a sawtooth-like sharp edge which the user of the belt finds to be unpleasant and which is even dangerous in the event of accidents occurring.

For that reason, although monofilament weft yarns have been woven into the belt in order to increase the stiffness of the belt in the transverse direction, the sawtooth effect of the edge of the belt has been eliminated by weaving hollow edges on to the belt. However, that systems suffers from various disadvantages. The use of special materials, in particular the need for weaving on hollow edges without strength functions, give rise to a not inconsiderable level of cost. Unless the machine is set precisely when producing an edge portion having a hollow edge, problems arise in regard to breaking strength and abrasion. Even when the hollow edge is applied in a proper fashion, unequal thicknesses always occur as between the central portion and the edge portion of the belt. In addition, when the belt is produced on a Jacquard loom, it is necessary to fit a special member.

The invention is therefore based on the problem of so improving a belt of the kind set forth in the opening part of this specification that the belt has adequate stiffness in the transverse direction thereof while nonetheless a hollow edge does not have to be woven on to the belt at the marginal portion thereof.

According to the invention, that problem is solved in that the belt is woven in a single-layer configuration, the multifilament weft thread is introduced into the fabric simultaneously with the monofilament weft thread, the monofilament weft thread in the marginal portion of the belt is covered by outward warp threads, and all warp threads have a load-carrying function in the fabric. Besides the normal multifilament weft thread, a generally polyester thread, in accordance with the invention the second weft thread is a monofilament polyester thread or the like, which has good elastic qualities and thus gives the belt permanent flexibility and stiffness in the transverse direction without increasing longitudinal stiffness. That is particularly important in order to ensure that the belt is properly wound on to and unwound from the automatic belt retractor unit. In addition, the film spool effect referred to above can be minimised in this manner.

The main advantage of the novel marginal portion of the belt is the elimination of a special edge, such as for example the abovementioned hollow edge with the disadvantages that that involves.

In accordance with the invention, it is advantageous for the monofilament and multifilament weft threads in the central portion to be introduced separately into a common shed. That is advantageously effected using separate needles or shuttles. Only the multifilament weft thread is disposed in the marginal portion of the belt so that the monofilament thread no longer sticks out at the outer edge of the belt, with the attendant dangers.

The invention is advantageously further embodied in that only one of the two longitudinal edges of the belt has the marginal portion with the covered monofilament weft threads. The other edge may be formed like a standard-weave edge. That gives rise to advantages in regard to the method of manufacture.

Any kind of basic cross-weaving can be produced with the novel system. The invention also makes it possible to produce optical edge effects. The use of a combination of multifilament and monofilament weft yarns also compensates for the poor seam strength of the monofilament thread when sewing up the belt, in particular the safety belt. The belt according to the invention may be applied to all weaving systems. It can be manufactured on standard machines, and there is no need to fit special attachments.

Further advantages, features and possible uses of the present Invention will be apparent from the following description of a preferred embodiment with reference to the single FIGURE of the accompanying drawing.

The drawing shows, extending from top to bottom, the white warp threads 1 which extend both over the central portion 2 and also over the marginal portion 3 which is shown on the left in the drawing. The belt of which part is illustrated is broken away at the top, at the bottom and at the right in the drawing. The weft thread used is on the one hand the multifilament weft thread which is denoted by reference numeral 4 and which is shown in black and on the other hand the monofilament weft thread which is generally denoted by reference numeral 5 and which is identified by hatching in the drawing.

It will be seen that both kinds of weft threads 4 and 5 are disposed in the central portion 2, but only the multifilament weft thread 4 is disposed in the marginal portion 3. The drawing shows the single-layer weave configuration of the belt, the monofilament weft thread 5 being covered by the outward warp threads 1 in the marginal portion 3. The warp threads 1 all have a load-bearing function in the fabric.

The multifilament weft thread 4 and the monofilament weft thread 5 are introduced into the fabric by separate shuttles (not shown). In that operation, as is shown accordingly in the drawing, both shuttles pass into a common shed in the central portion 2. Only the multifilament weft thread 4 is introduced into the weave in the marginal portion 3.

That arrangement ensures that the monofilament thread 5 does not project at the outer edges (at the left-hand edge of the marginal portion 3 in the drawing). In the belt fabric illustrated, the monofilament thread 5 is not to be found in the edge portion 3, for it is covered by the outward warp threads 1.

A belt fabric according to the invention is preferably produced on a standard double-needle double-shed Jacquard or weaving loom.

In the case of belts which are woven on needle looms, preferably only one edge is woven in the above-described manner. The opposite side is produced by means of a knitting needle, by the stop thread which is taken into the fabric to such a distance that the same effect is attained as in the case of a normal-weave or standard-weave edge.

Systems which provides a crocheting action with one or two stop threads are most suitable for that purpose.

I claim:

1. A single-layer woven belt having a monofilament (5) and a multifilament weft thread (4), a central portion (2) and a marginal portion (3), wherein the multifilament weft thread (4) is introduced into the fabric with the monofilament weft thread (5), the monofilament weft thread (5) in the marginal portion (3) of the belt is covered by outward warp threads (1), and all warp threads (1) have a load-carrying function in the fabric.

2. A belt according to claim 1 characterised in that said monofilament weft thread (5) is covered by said outward warp threads (1) only in said marginal portion (3).

3. A single-layer woven belt having warp threads defining a central portion and a marginal portion; a monofilament weft thread; and a multifilament weft thread, wherein said monofilament weft thread and said multifilament weft thread are disposed in said central portion, and only said multifilament weft thread is disposed in said marginal portion.

4. The belt of claim 3, wherein for each portion of said monofilament weft thread disposed transversly of said warp threads in said central portion, there is one and only one adjacent weft thread portion which overlies and underlies the same warp threads as does said monofilament portion, and said adjacent weft thread portion is a portion of said multifilament weft thread.

5. The belt of claim 3, wherein said monofilament weft thread and said multifilament weft thread are disposed in said central portion as double picks.

6. The belt of claims 3, 4, or 5, wherein said multifilament weft thread and said monofilament weft thread are alternately disposed in said central portion.

7. The belt of claims 3, 4 or 5, wherein only said marginal portion has only said multifilament weft thread disposed therein.

8. The belt of claims 3 or 4, wherein said warp threads further define a second marginal portion, said central portion being disposed between said marginal portion and said second marginal portion, and both said monofilament and said multifilament weft threads are disposed in said second marginal portion.

9. A single-layer woven belt having warp threads defining a central portion and a marginal portion; a monofilament weft thread; and a multifilament weft thread, wherein said monofiliment weft thread and said multifilament weft thread are disposed in said central portion, and only said multifilament weft thread is disposed in said marginal portion, made according to a process comprising the following steps:

forming a shed in said central portion;

inserting said monofilament weft thread into said shed; and inserting said multifilament weft thread into said shed.

10. The belt of claim 9, wherein said inserting steps are performed by separate weft thread insertion means.

11. The belt of claim 9 or claim 10, wherein said inserting steps are performed simultaneously.

* * * * *